US009041587B2

(12) United States Patent
Longstaff

(10) Patent No.: US 9,041,587 B2
(45) Date of Patent: May 26, 2015

(54) APPARATUS AND METHOD FOR ASSISTING VERTICAL TAKEOFF VEHICLES

(71) Applicant: Teledyne Technologies, Incorporated, Thousand Oaks, CA (US)

(72) Inventor: Ian Dennis Longstaff, West End (AU)

(73) Assignees: Teledyne Australia PTY LTD, Eight Mile Plains (AU); Teledyne Technologies Incorporated, Thousand Oaks, CA (US)

( * ) Notice: Subject to any disclaimer, the term of this patent is extended or adjusted under 35 U.S.C. 154(b) by 178 days.

(21) Appl. No.: 13/847,283

(22) Filed: Mar. 19, 2013

(65) Prior Publication Data

US 2014/0125511 A1   May 8, 2014

Related U.S. Application Data

(63) Continuation-in-part of application No. 13/190,106, filed on Jul. 25, 2011, now Pat. No. 8,427,360, which is a continuation of application No. PCT/AU2010/000082, filed on Jan. 28, 2010.

(30) Foreign Application Priority Data

Jan. 30, 2009   (AU) ................................ 2009900337

(51) Int. Cl.
*G01S 13/89* (2006.01)
*G01S 7/04* (2006.01)
(Continued)

(52) U.S. Cl.
CPC .............. *G01S 13/913* (2013.01); *G01S 13/882* (2013.01); *G05D 1/0676* (2013.01); *G01S 2013/0254* (2013.01)

(58) Field of Classification Search
CPC ................ G01S 13/913; G01S 13/882; G01S 2013/0254; G05D 1/0676
USPC .............. 342/33–36, 38, 29, 63, 65, 179–182
See application file for complete search history.

(56) References Cited

U.S. PATENT DOCUMENTS 3,842,417 A   10/1974  Williams
3,924,236 A   12/1975  Earp et al.
(Continued)

FOREIGN PATENT DOCUMENTS

WO   WO 2007/045026      4/2007
WO   WO 2007/082335 A1   7/2007
(Continued)

OTHER PUBLICATIONS

Mayer, W.; Gronau, A.; Menzel, W.; Leier, Helmut, "A Compact 24 GHz Sensor for Beam-Forming and Imaging," Control, Automation, Robotics and Vision, 2006. ICARCV '06. 9th International Conference on , vol., no., pp. 1,6, Dec. 5-8, 2006.*
(Continued)

*Primary Examiner* — John B Sotomayor
(74) *Attorney, Agent, or Firm* — K&L Gates LLP

(57) ABSTRACT

According to one aspect of the present invention, a radar system is provided which accurately measures the surface profile in a wide sector beneath and forward of a helicopter, to aid low level transit and landing in poor visibility. This uses an electronic beam synthesis technique to form multiple beams directed at the area of interest, each measuring the distance to the first reflected signal received by each beam. These distances represent the profile of the ground and any objects on the ground. A processor then compares the measured profile with the ideal ground profile for safe landing. If the deviations from straight and level exceed the specified requirement for safe landing, or if sufficient rotor clearance is not detected, then a warning is given to the operator. A display will show the measured ground profile highlighting the unsafe regions, allowing the operator to seek a safe region to land. The novelty lies in the way the beams are formed to measure and display the ground profile and provide a warning system. This beam-forming technique is simpler and more cost effective than with a conventional phased array radar.

22 Claims, 8 Drawing Sheets

(51) Int. Cl.
  *G01S 13/91* (2006.01)
  *G01S 13/88* (2006.01)
  *G05D 1/06* (2006.01)
  *G01S 13/02* (2006.01)

(56) References Cited

U.S. PATENT DOCUMENTS

| | | | |
|---|---|---|---|
| 4,571,591 | A | 2/1986 | Valentino et al. |
| 4,612,547 | A | 9/1986 | Itoh |
| 5,038,150 | A | 8/1991 | Bains |
| 5,465,142 | A | 11/1995 | Krumes et al. |
| 5,657,024 | A | 8/1997 | Shingyoji et al. |
| 5,790,071 | A | 8/1998 | Silverstein et al. |
| 5,845,024 | A | 12/1998 | Tsushima et al. |
| 6,104,346 | A | 8/2000 | Rudish et al. |
| 6,215,443 | B1 | 4/2001 | Komatsu et al. |
| 6,246,365 | B1 | 6/2001 | Tokoro |
| 6,437,750 | B1 | 8/2002 | Grimes et al. |
| 6,527,456 | B1 | 3/2003 | Trezza |
| 6,664,529 | B2 | 12/2003 | Pack et al. |
| 6,792,171 | B2 | 9/2004 | Hargis et al. |
| 6,850,183 | B2 | 2/2005 | Reeves et al. |
| 6,851,870 | B1 | 2/2005 | Deng et al. |
| 6,889,010 | B2 | 5/2005 | Trezza |
| 7,011,455 | B2 | 3/2006 | Luo et al. |
| 7,106,217 | B2 | 9/2006 | Judge et al. |
| 7,149,147 | B1 | 12/2006 | Goldman et al. |
| 7,306,377 | B2 | 12/2007 | Ellison |
| 7,391,362 | B2 | 6/2008 | Beckner |
| 7,456,779 | B2 | 11/2008 | Cross |
| 7,668,374 | B2 | 2/2010 | Harder |
| 7,762,085 | B2 | 7/2010 | Exley et al. |
| 7,978,120 | B2 * | 7/2011 | Longstaff ............ 342/22 |
| 8,248,298 | B2 * | 8/2012 | Lalezari ............ 342/179 |
| 2007/0086657 | A1 | 4/2007 | Harder et al. |
| 2007/0139248 | A1 | 6/2007 | Baharav |
| 2007/0140174 | A1 | 6/2007 | Proctor |
| 2008/0071169 | A1 | 3/2008 | Craddock et al. |
| 2008/0074307 | A1 | 3/2008 | Boric-Lubecke et al. |
| 2008/0074312 | A1 | 3/2008 | Cross et al. |
| 2010/0141527 | A1 * | 6/2010 | Lalezari ............ 342/368 |
| 2010/0164784 | A1 | 7/2010 | Longstaff |
| 2010/0204867 | A1 | 8/2010 | Longstaff |
| 2014/0125511 | A1 * | 5/2014 | Longstaff ............ 342/33 |

FOREIGN PATENT DOCUMENTS

| | | |
|---|---|---|
| WO | WO 2009/036507 | 3/2009 |
| WO | WO 2010/085846 | 10/2010 |

OTHER PUBLICATIONS

U.S. Appl. No. 12/161,660, filed Nov. 2009, Longstaff.
U.S. Appl. No. 12/161,290, filed Oct. 2008, Longstaff.
International Search Report mailed Nov. 21, 2008 for PCT Application PCT/AU2008/001386.
Bliss, D.W. Forsythe, K. W. "MIMO Radar Medical Imaging: Self Interference Mitigation for Breast Tumor Detection" Signals, Systems and Computers 2006, ACSSC '06. Fortieth Asilomar Conference on Oct.-Nov. 2006, pp. 1558-1562.
Liu, Bo Chan, Chunlin Liu, Benyoung: "Receiving Signal Processing of Wideband MIMO Radar Based on Transmitting Diversity", Radar, 2006. CIE '06 International Conference on Oct. 2006. pp. 1-4.
Bliss, D.W. Forsythe, K.W "Multiple-Input Multiple Output (MIMO) Radar and Imaging: Degrees of Freedom and Resolution", Signals, Systems and Computers 2003, Conference Record on Thirty Seventh Asilomar Conference on, Nov. 9-12, 2003, pp. 54-59 vol. 1.
Chu-Yang Chen Vaidyanathan, P.P.: "A Subspace Methodfor MIMO Radar Space-Time Adaptive Processing" Acoustics, Speech and Signal Processing, 2007. ICASSP 2007. IEEE International Conference on. Apr. 15-20, 2007, vol. 2, pp. 925-928.
IEEE Xplore Release 2.5; http://ieeexplore.ieee.org/xpls/absprintf.jsp?arnumber=1291865; Multiple-Input Multiple Output (MIMO) Radar and Imaging: Degrees of Freedom and Resolution; Bliss D.W. Forsythe K.W. Lincoln Lab., MIT, Lexington, MA,USA.
IEEE Xplore Release 2.5; http://ieeexplore.ieee.org/xpls/absprintf.jsp?arnumber=4176830; MIMO Radar Medical Imaging: Self Interference Mitigation for Breast Tumor Detection; Bliss, D.W. Forsythe, K.W. MIT Lincoln Laboratory, Lexington, MA.
IEEE Xplore Release 2.5; http://ieeexplore.ieee.org/xpls/absprintf.jsp?arnumber=4217561; A Subspace Method for MIMO Radar Space-Time Adaptive Processing; Chun-Yang Chen Vaidyanathan, P.P. Dept of Electr. Eng., California Inst of Technol., Pasadena, CA.
IEEE Xplore Release 2.5; http://ieeexplore.ieee.org/xpls/absprintf.jsp?arnumber=4148263; Receiving Signal Processing of Wideband MIMO Radar Based on Transmitting Diversity; Liu, Bo Han, Chunlin Liu Benyong Institute of Electronic Engineering, University of Electronic Science and Technology of China, Chengdu, China.
Vaskelainen, L.J., "Virtual Array Synthesis Method for Planar Array Antennas," IEEE Transactions of Antennas and Propogation, vol. 46, No. 3, Mar. 1998, pp. 391-396.
International Search Report and Written Opinion of the International Searching Authority from International Application No. PCT/AU2007/000033, mailed on Feb. 15, 2007.
Donnet, B.J.; Longstaff, I.D., MIMO Radar, Techniques and Opportunities, Sep. 13-15, 2006, Radar Conference, 2006. EuRAD 2006, 3rd European, 112-115.
Bo Liu; Chunlin Han; Benyoung Liu, Receiving Signal Processing of Wideband MIMO Radar Based on Transmitting Diversity, Oct. 16-19, 2006, Radar, 2006. CIE '06. International Conference, 1-4.
2000 Annual Report, Teledyne Technologies.
Golden Shu, et al., "Design and Evaluation of Fiber Tip Lenses for Fiber Optic Transmitter and Receiver Applications," IEEE 2007.
International Search Report on related PCT/AU2010/000082, mailed on Aug. 27, 2010.

* cited by examiner

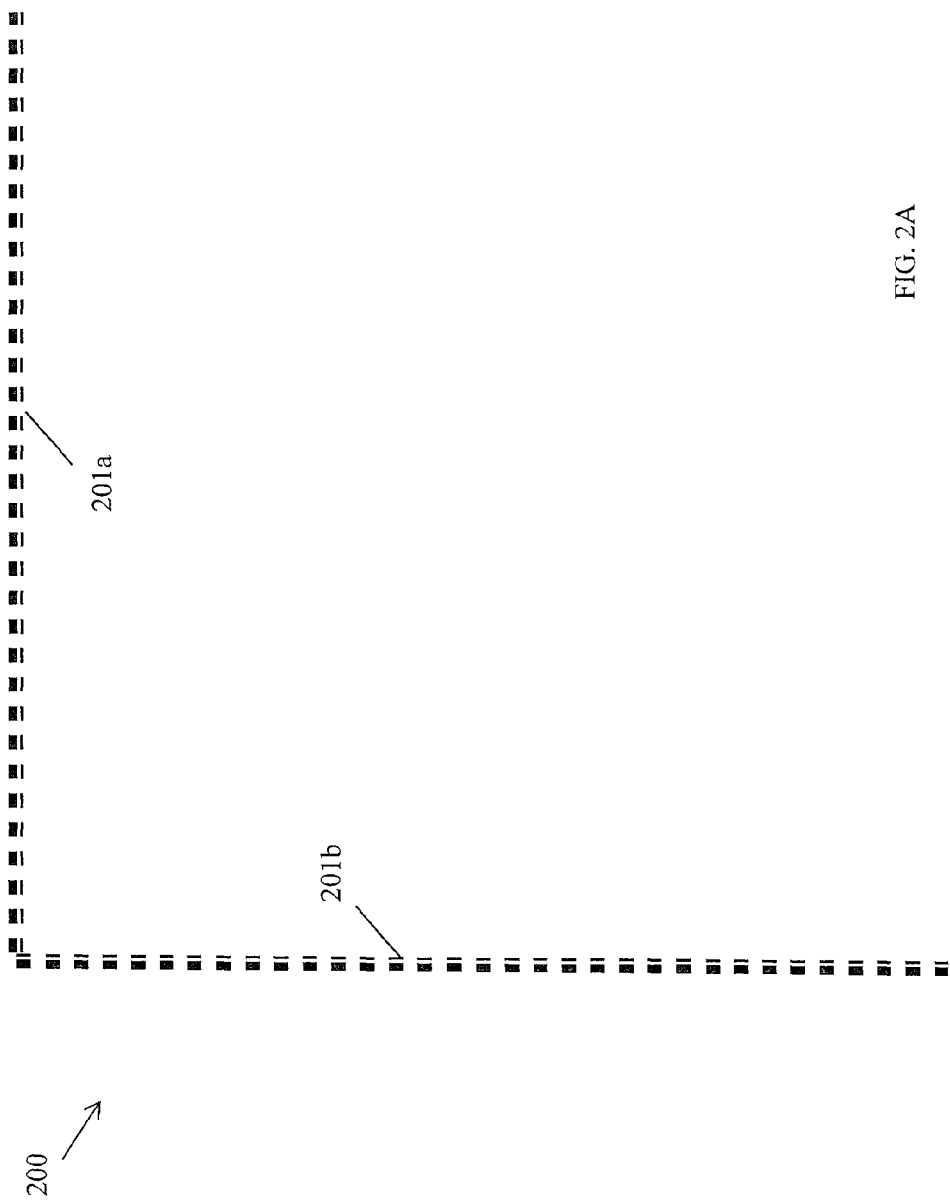

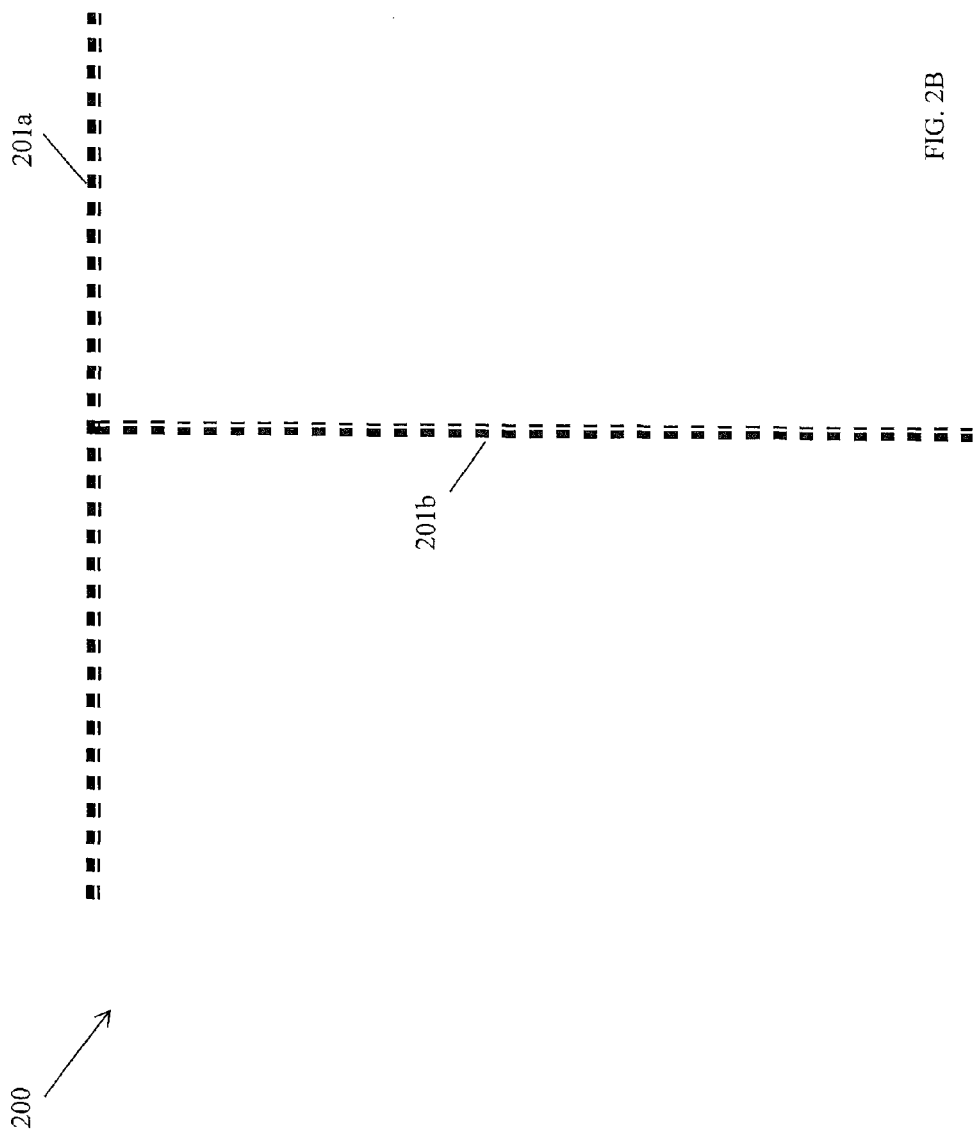

ns. Typically these operations require helicopters to minimize their presence by flying low and without lights. During such operations pilots become more dependent upon their instruments and limited information regarding terrain from night vision systems (if available).

APPARATUS AND METHOD FOR ASSISTING VERTICAL TAKEOFF VEHICLES

CROSS-REFERENCE TO RELATED APPLICATIONS

This is a continuation-in-part application of co-pending U.S. non-provisional application Ser. No. 13/190,106, filed Jul. 25, 2011 which is a continuation of PCT/AU2010/000082 filed Jan. 28, 2010 which is a PCT Application of Australian Patent Application No. 2009900337, filed Jan. 30, 2009. This application also claims the benefit of PCT/US/2013/027831 filed Feb. 26, 2013, the disclosures of each are all hereby incorporated by reference in their entirety.

BACKGROUND OF THE INVENTION

1. Field of the Invention

The present application relates to apparatus and methods for assisting operators of vertical takeoff vehicles in landing operations within environments of low visual acuity. In particular although not exclusively the present application relates to a radar altimeter for assisting in landing operations of vertical takeoff vehicles.

2. Related Art

Many incidents and accidents involving the use of vertical takeoff vehicles occur frequently during takeoff and landing operations. Given the complex mechanics of the vehicles involved, a wide array of variables can influence the success of these operations. Numerous accidents causing from minor damage or, at worst, destruction of the vehicle have resulted from environmental factors such as terrain type, wing and rotor clearance, etc.

One cause of accidents in landing operations is setting the vehicle down on steep or uneven terrain. From the air it can be difficult to sight imperfections in the landing area. Setting the craft down on steep or uneven surfaces can cause the craft to pitch and tip over. Another major factor in terms of the terrain type, which can affect landing and takeoff operations, is the composition of the landing/takeoff surface. For example in arid landing and takeoff environments sand, dust and other debris can be kicked up into the air by the down draft created by the vehicle. This situation is known as a "brownout". In essence the debris that is kicked up into the air creates a cloud which can completely obscure the operators view to the landing zone and surrounding landmarks.

In the case of vehicles such as a helicopter, the increased turbulence created by the rotors (rotor wash) can create eddy currents within the particulate cloud. The swirling mass of particles can lead the pilot to experience the vection illusion, a form of spatial disorientation where the helicopter appears to be turning when it is actually in a level hover. A pilot not using the flight instruments for reference may instinctively try to level the aircraft, resulting in an accident.

The brownout problem has been keenly noted by the US military. Since 1991, there have been over 230 cases of aircraft damage and/or injury due to unsuccessful take-offs or landings in arid environments. Although the majority of the incidents occur during landing, there have been a significant number of incidents occurring during takeoff. Of the more than 50 brownout incidents occasioning damage reported during the period of 2001-2007, 80 percent were during landings and 20 percent during takeoffs. On average the number of brownout incidents occasioning damage costs the US military US$100 million per year.

In addition to the brownout problem, a large number of helicopter operations are carried out under the cover of darkness. Typically these operations require helicopters to minimize their presence by flying low and without lights. During such operations pilots become more dependent upon their instruments and limited information regarding terrain from night vision systems (if available).

One piece of equipment which can provide a pilot with valuable information in both brownout conditions and night time operations is a radar altimeter. The basic radar altimeter utilizes a radar ranging system which measures the time delay of the signal reflected from the nearest object within a single wide beam illuminating the ground. This wide-beam is intended to monitor aircraft height even when in a bank or flying near steep slopes.

One example of a radar altimeter is shown in U.S. Pat. No. 5,047,779 to Hager which is capable of tracking at least two targets. The altimeter of Hager information relating to the first target is captured via a first set of radar antennas and stored before the altimeter switches to a track and store information of the second target via a second set of radar antennas. U.S. Pat. No. 6,750,807 also to Hager et al., describes a similar scheme, but with a forward-looking scanning beam for obstacle warning. Both arrangements proposed in Hager patents simply provide range information to both targets and as such are generally useful in assisting a pilot with obstacle avoidance in flight. Neither of the altimeter Hager patents is capable of providing the pilot of any useful information regarding the tomography of the desired landing surface.

One approach to assisting pilots with obstacle avoidance in degraded visual conditions is discussed in U.S. Pat. No. 7,106,217 to Judge et al. The approach of Judge relies on merging data from a number of sensors to allow a display and fly-by-wire capability in poor visibility. While the system of Judge is capable of assisting a pilot with identifying the position of the aircraft relative to the select landing zone, and any obstacles within range of the aircraft, it does not provide the pilot any useful information regarding the topography of the desired landing surface.

Thus it would be advantageous to provide a system and method that would not only assist an operator of a vertical takeoff vehicle in identifying obstacles in flight and around a landing zone, but also provide the operator with information on the topography of the landing surface. It would also be advantageous to provide a system and method that is capable of producing accurate information regarding the topography of the landing surface in conditions of minimal visual acuity.

SUMMARY OF THE INVENTION

Accordingly, in one aspect of the present invention, there is provided a radar ranging system for imaging the topography of an area of interest; said system comprising at least one linear arrays of, for instance, 32 transmitter elements that transmit transmitter beams comprising a sequence of ranging signals phased to form a beam pattern covering part of the area of interest, the sequence phased to scan the beam pattern over an entire area of interest, at least one linear array of, for instance, 32 receiver elements arranged orthogonally to the transmitter linear arrays, e.g., as shown in FIG. 2A, 2B or 2D, wherein each receiver element receives a time sequence of the ranging signals reflected from variations on the ground as illuminated by the sequence of the ranging signals, the receiver elements each producing a receiver signal; and at least one processor adapted to process each receiver signal, wherein the at least one processor forms a multiplicity of receiver beams complementary to the transmitter beams such that the combination of the transmitter beams and the receiver beams form pencil beams which cover the entire area of interest in time sequence, wherein the at least one processor measures a time delay of a first reflection received in each of the formed pencil beams and converts the time delay into a range measure at each beam angle to form a topographic profile of the area of interest in range and beam angle coordinates. The at least one transmitter array may comprise two parallel transmitter sub-arrays of, for instance, 16 elements each operating at about 35 GHz and the at least one linear array of receiver elements may comprise two parallel receiver sub-arrays of 16 elements each. In this configuration, the spacing between the two parallel receiver sub-arrays should be equal to the length of each transmitter sub-array; likewise the spacing between the two parallel transmitter sub-arrays should be equal to the length of each receiver sub-array. The two pairs can be separated, such as shown, e.g., in FIG. 2E, or they can be in the form of a perimeter array, such as shown, e.g., in FIG. 2C, for a more compact arrangement. These arrangements of transmitter and receiver arrays, with a total of 32 transmitter elements and 32 receiver elements, and half wavelength spacing between the elements, forms 1024 pencil beams.

A time delay on the first return in each beam may be captured and scaled to a range measurement. The shortest range measured by all the beams may be displayed numerically as radar altitude.

The processor may be configured to process the topographic profile to display an image of the terrain topography in the area of interest and/or the processor may be configured to process the topographic profile in the area of interest to determine if the area of interest is safe for landing an aircraft. The processor may be configured to provide a warning signal if a hazard is present and configured to show a hazard and/or a safe area on a display. The display of the topographic profile may include a color display, a contour display, or a mesh plot display.

The display may be referenced to a vertical coordinate system and/or may be referenced to a coordinate system of a platform employing the imaging system. Moreover, the display may be presented as an artificial perspective of the ground as viewed looking forward from an aircraft platform.

The topographic profile may be compared with a threshold value denoting the slope, a level clearance, and a flatness according to pre-specified data to safely land an airborne vehicle within the area of interest and display suitable and unsuitable areas to an operator of the airborne vehicle. Moreover, the processor may be adapted to compare the topographic profile with pre-specified profiles needed for safe rotor and tail rotor clearance on approach to the area of interest and display suitable and unsuitable areas for landing.

The signal processor may form a guard channel to mitigate the effect of sidelobe leakage. This sets a detection threshold for all beams to ensure the signal detected in any beam has not entered through the sidelobes of its directional pattern. For this, for any one beam, the signal processor may weight the signals from all other beams according to the sidelobe pattern of the one beam and set the detection threshold above this by a suitable margin.

In one aspect, the processor may perform the Clean Algorithm on the data streams from all the beams to mitigate any effects caused by sidelobe leakage. This algorithm may sequentially subtract small proportions of the currently strongest beam signal from the signals in other beams, until the cross correlation, and hence the leakage, between signals from all the beams is minimized.

The radar ranging system may be mounted to look down, to assist operators make a vertical landing. The radar ranging system may be mounted to include a suitable forward look in the area of interest, to assist operators making a forward approach to the landing zone.

BRIEF DETAILS OF THE DRAWINGS

In order that this invention may be more readily understood and put into practical effect, reference will now be made to the accompanying drawings, which illustrate preferred embodiments of the invention, and wherein:

FIG. 2A is a schematic diagram of an open array arrangement antenna which may be used in a radar altimeter, according to principles of the invention;

FIG. 2B is a schematic diagram of a T-shaped open antenna array which may be used in a radar altimeter, configured according to principles of the invention;

DESCRIPTION OF THE INVENTION

Figure 1:
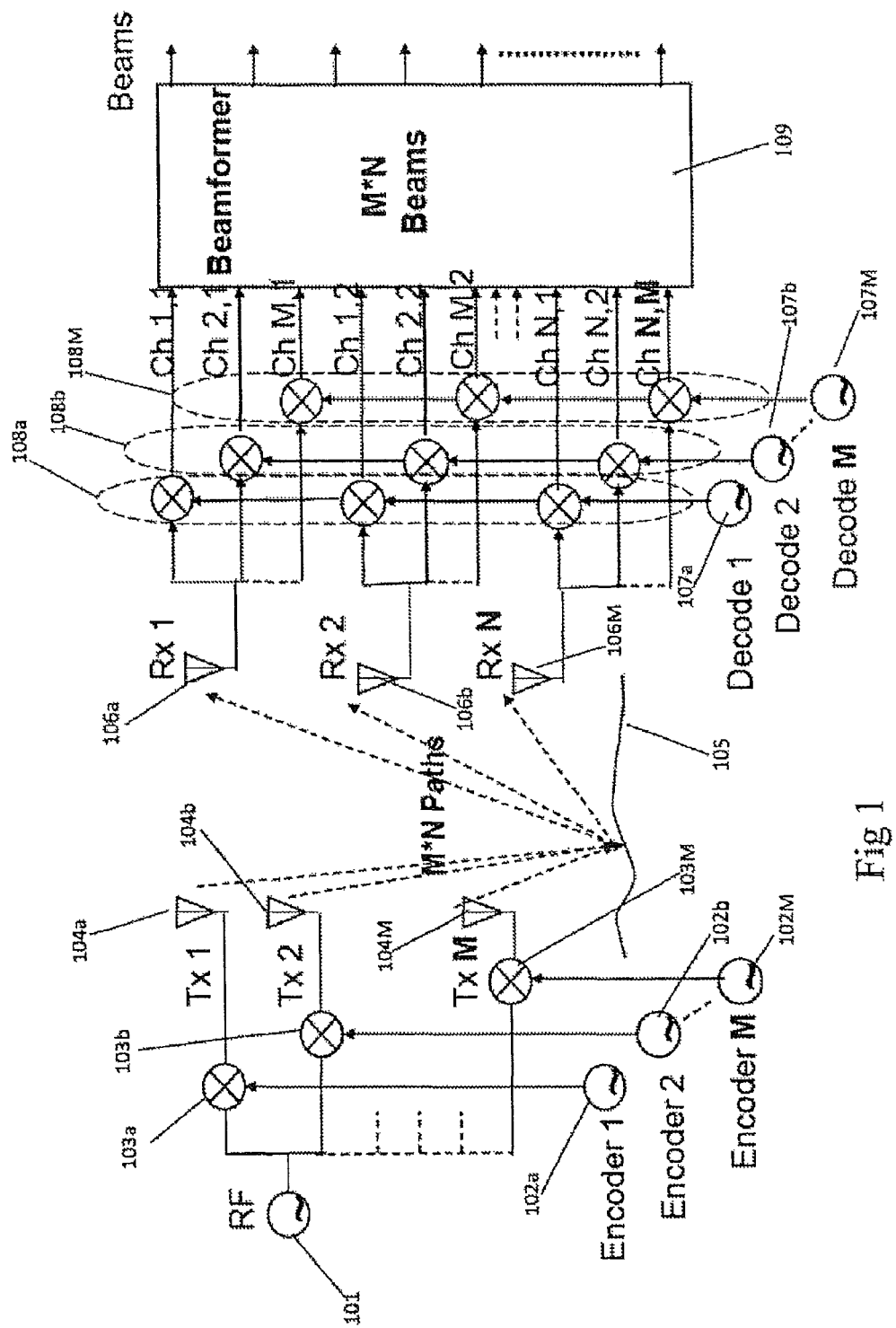
FIG. 1 is a schematic diagram of a radar system according to principles of the invention.

The disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "processor", as used in this disclosure, means any machine, device, circuit, component, or module, or any system of machines, devices, circuits, components, modules, or the like, which are capable of manipulating data according to one or more instructions, such as, for example, without limitation, a computer, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any practical order. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. A computer program product may be provided that stores software configured to, when read and executed by a processor, perform one or more steps of the processes described herein.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

In order to produce a finely detail ground profile image via radar a multiplicity of beams is required. This conventionally requires a scanning dish antenna or phased array radar with many antenna elements and associated scanning electronics, making such systems complex and expensive.

An alternative approach to the formation of multiple beams is to utilize Multiple Input Multiple Output (MIMO) technique in association with orthogonal or near orthogonal transmitter and receiver antenna arrays. The MIMO technique makes use of the fact that the signal received from the far field with a bi-static transmitter receiver pair is identical to the signal which would be received by a single mono-static transmit/receive element placed at the mid point between the bi-static pair. For convenience, where the targets are in the far field, the image computation can be based on the geometry arising from a notional plurality of transient elements. The technique can also be used for signals from the nearer field, but additional processing by, e.g., a computer or processor, is required to account for an ellipsoidal co-phase surface with the bi-static elements at the foci. In the far field this ellipsoid tends to a spherical surface centered on a synthetic element at the mid-point.

The formation of multiple beams under MIMO processing is only possible where each receiver element is able to separate the return signals in order to match them to the corresponding signals transmitted from each transmitter element (i.e. a form of multi-static processing within the array itself). By transmitting separable signals from each of M transmitter elements, then capturing and processing the reflected signals from each of M transmitters in each of the N receiver elements, it is possible to form a number of beams equal to the product of the transmitter and receiver element numbers N×M. Typically this may be achieved by transmitting from each element in turn (time division multiplexing), or by simultaneously transmitting separable code sequences from each element (code division multiplexing), or by simultaneously transmitting differing frequency sequences (for instance orthogonal frequency division multiplexing). The code sequences required for signal separability can also serve the need for pulse compression.

The use of time division multiplexing, code division multiplexing, orthogonal frequency division multiplexing, combinations of these, and other coding techniques for applications in MIMO radar systems are discussed in the inventors earlier filed international applications PCT/AU2007/000033, PCT/AU2008/000628 and PCT/AU2008/001386 now assigned to the applicant all of which are incorporated herein by reference.

FIG. 1 illustrates the concept of synthesizing multiple beams under the MIMO technique. In this particular example the coding scheme is modulated onto a carrier 101 by encoders 102a, 102b, . . . , 102M via mixers 103a, 103b, . . . , 103M to produce a set of M discrete coded signal, before being transmitted toward the area of interest 105 from transmitting elements 104a, 104b, . . . , 104M.

A set of reflected encoded signals is received by each receiver element 106a, 106b, . . . , 106N, i.e., each receiver element captures reflected signals corresponding to the transmitted signals from each of the transmitter elements Tx1, Tx2, . . . , TxM. The received encoded signals are then decoded by applying a decode signal 107a, 107b, . . . , 107M to each of the received signals captured ([Rx11, Rx12, . . . , Rx1M], [Rx21, Rx22, . . . , Rx2M], . . . , [RxN1, RxN2, . . . , RxNM]) by each of the receiver 106a, 106b, . . . , 106N via banks of mixers 108a, 108b, . . . , 108N. This produces a set of [1, 2, . . . , M] received channels for each receiving element 106a, 106b, . . . , 106N, which is then set to a beamforming unit 109 to produce M×N beams.

The proposed radar altimeter according to one embodiment of the present invention utilizes a downward looking MIMO phased array to form multiple beams, covering a relatively wide sector, +/−60 degrees or thereabouts. The distance to the ground is then measured in each beam allowing the ground profile to be formed. The beams may be tilted forward to cover from +90 degrees forward (horizontal) to 30 degrees behind nadir. The provision of such a forward tilt gives a greater degree of coverage in the direction of approach vector to the ground. This additional cover enables the altimeter to more accurately detect other vehicles in the proximity to the current approach vector of the vehicle to the desired landing zone. Such functionality is exceedingly desirable in instances where multiple vehicles are to be landed within a limited space, e.g., a deck of an aircraft carrier, etc.

Figure 2C:
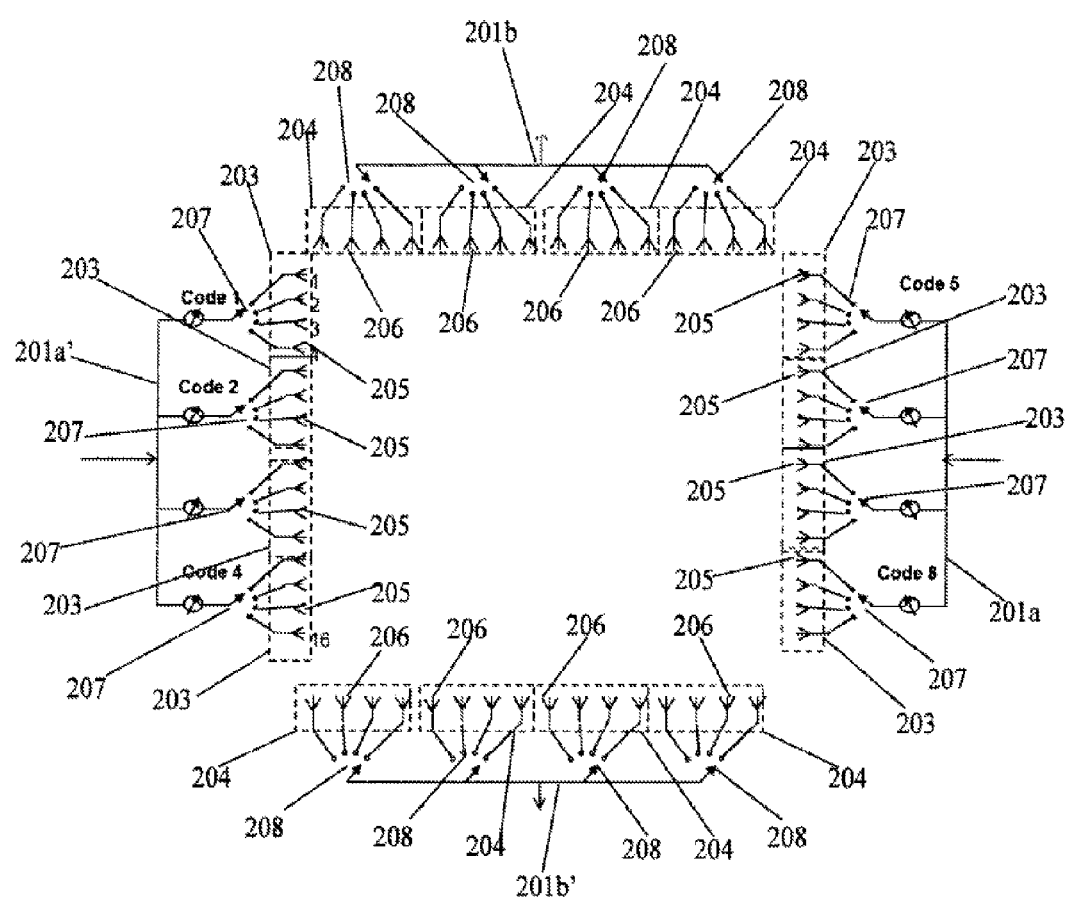
FIG. 2C is a schematic diagram of a perimeter antenna array which may be used in a radar altimeter, configured according to principles of the invention.
Figure 2D:
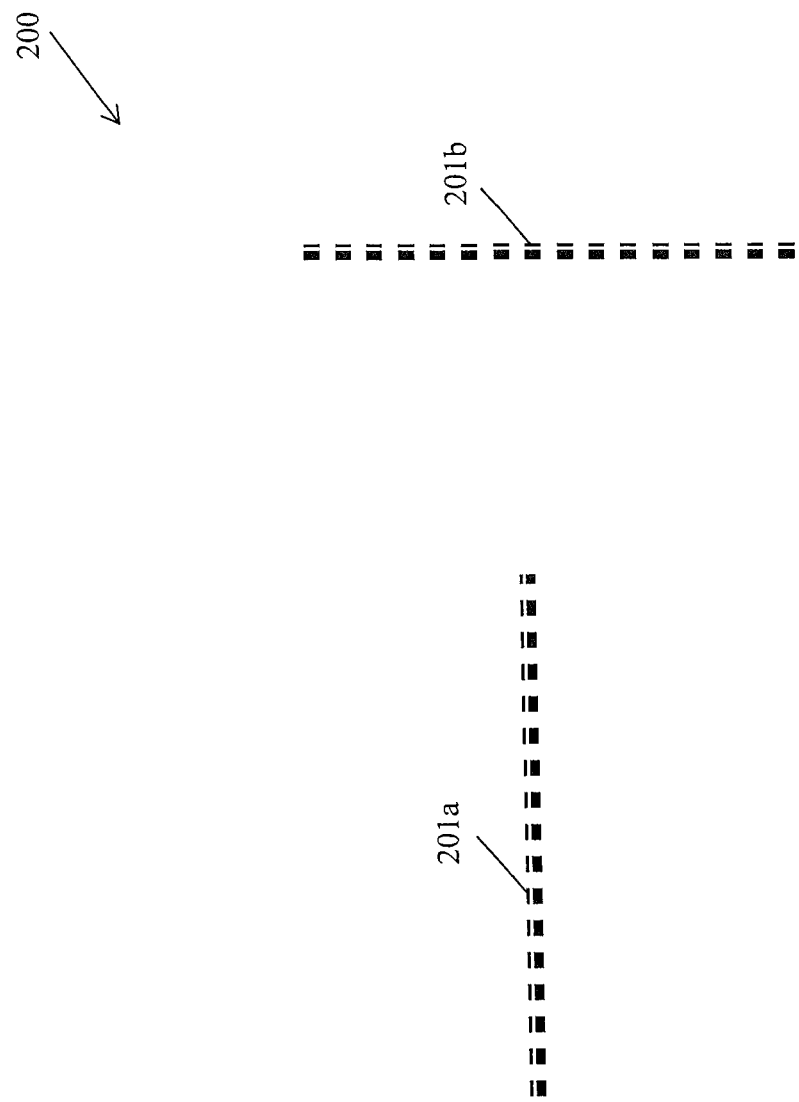
FIG. 2D is a schematic diagram of a spaced-apart T-shaped open antenna array which may be used in a radar altimeter, configured according to principles of the invention.
Figure 2E:
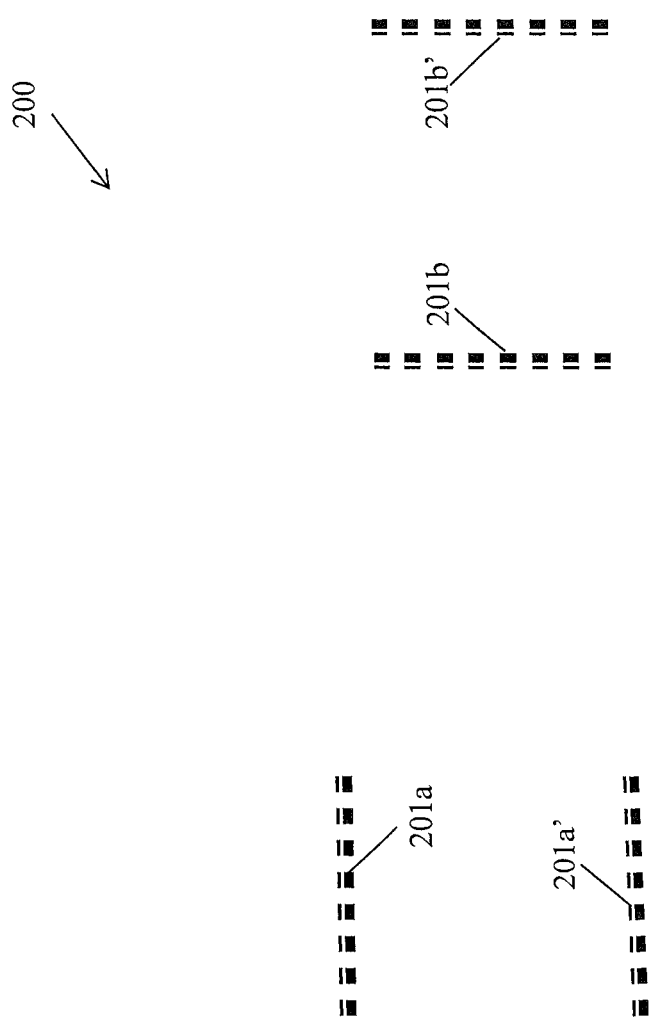
FIG. 2E is a schematic diagram of an antenna array showing sub-arrays arranged to form a generally parallel Tx and Rx pairs, with one pair adjacent to and spaced apart from the other pair, to form displaced pairs, configured according to principles of the invention.

A number of possible configurations of a suitable array 200 are illustrated in FIGS. 2A to 2E. FIG. 2A depicts an open array 200 arrangement which is formed from two sub-arrays 201a, 201b, one a transmitter array and one receiver array arranged substantially orthogonal to one another such that they form an L shape. An alternative open array construction 200 is shown in FIG. 2B in this case the sub-arrays 201a, 201b have been arranged to form a T shape. Again, the sub-arrays 201a, 201b are aligned substantially orthogonal to one another. FIG. 2D is similar to FIG. 2B in this case the sub-arrays 201a, 201b have been arranged to form a generally T shape. Sub-array 201a is shown as 16 transmitters and sub-array 201b is shown as 16 receivers, with the arrays spaced apart. FIG. 2E shows a broken-square format. In the case of FIG. 2E, the sub-arrays 201a, 201b have been arranged to form a generally parallel Tx and Rx pairs, with one pair adjacent to and spaced apart from the other pair, to form displaced pairs.

FIG. 2C depicts one possible configuration of a closed array 200 which is referred to as perimeter array. As shown, the array includes 32 transmitter elements and 32 receiver elements arranged into four sub-arrays. Two transmitter sub-arrays 201a, 201a' disposed on opposing sides of the array and orthogonal to the two receiver sub-arrays 201b, 201b'.

Each of the transmitter sub-arrays 201a, 201a' includes 16 antenna elements arranged in banks 203 of four antennas 205. Each transmission bank 203 is coupled to a switching network 207. The selection of which transmission elements 205 are active during the transmission cycle is determined by the switching network 207 which opens and closes the appropriate switches to activate the appropriate antenna element 203 based on the chosen multiplexing scheme.

As with the transmitter sub-arrays 201a, 201a', the receiver sub-arrays 202b, 202b' are arranged into banks 204 of four antenna elements 206. Each receiver bank 204 is coupled to a switching network 208 which passes the signals received by the active receiver elements 206 to the back-end processing section.

Preferably, each of the antenna elements in the sub-arrays 201a, 201a' and 202b, 202b' have the same polarization. The antenna elements should also be selected to provide sufficient beam width (element directional pattern) to illuminate a sufficient area directly beneath and beyond the extremities of the vehicle e.g. +/−60 degrees in a long track and cross track. The spacing between the elements would need to be slightly greater than a half wavelength sufficient to synthesize 32 beams within the +/−60 degree element beam. While the array shown in FIG. 2C is a square parameter array, it will be appreciated by those skilled in the art that the array may be in the form of any suitable shape where multiple combinations of transmitter/receiver pairs allow the formation of a filled aperture. Such configurations might include a rectangle, a T or L shape, a circle, octagon or the like. Alternatively, a parallel pair of transmitters displaced from an orthogonal pair of parallel receiver arrays (i.e., formed as ∥=) can be used where it is desirable to minimize transmitter to receiver leakage.

Figure 3:
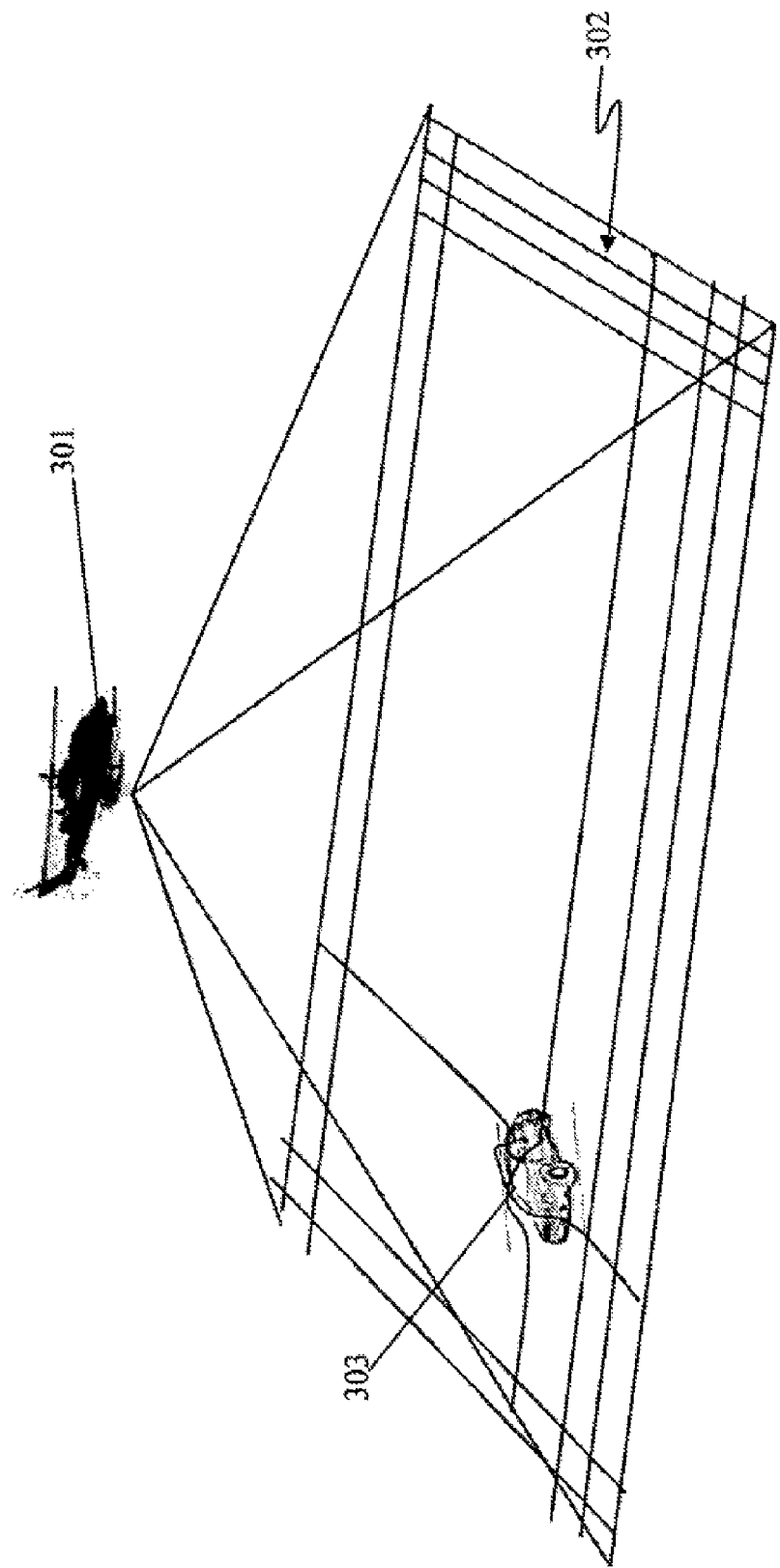
FIG. 3 is a schematic diagram depicting landing area surveying operation performed by a radar altimeter, according to principles of the invention.

FIG. 3 depicts the use of a MIMO array in a ground profiling operation in a radar altimeter according to one embodiment of the present invention. As shown, the aircraft 301 scans the desired landing zone 302. The synthesized beams each form a narrow cone. Hence, the illuminated patch 302 is wide at higher altitudes. However, as the aircraft 301 descends smaller features of the ground profile can be resolved.

Each of the transmitter elements 203 in the array 200 radiate a sequence of M differing signals, the ground reflections from which are captured by each of the N receiver element 206 of the array. Each of the N receiver elements then separates out the M received ground reflections from the M transmitters to produce M×N differing received channels.

The channels are formed into M×N beams by co-phasing the data channels to remove the phase shifts associated with a particular angle of arrival and then summing. Then by suitably filtering the data in each beam, a set of range profiles is formed, thereby allowing the time delay of the return signal via the nearest point in each beam be measured and converted to a distance. These distance measures are then converted into a profile showing the ground and any obstacles 303 on the ground, allowing the suitability of a selected landing zone to be assessed.

In one aspect, separate transmitter and receiver elements may be formed where the transmitter array is electrically scanned and the receiver array forms a multiplicity of receiver channels such that the combined transmitter and receiver patterns form a set of pencil beams. These arrays may be mounted to, e.g., a helicopter, so that the scanning beams cover the sector below and forward of the helicopter. This has an advantage over conventional scanned phased array radar in that the set of scanning beams can complete a full scan of a sector much faster than a single scanning beam of a conventional phased array. The transmitter antenna 201a may be a linear array of elements, such as shown in, e.g., FIG. 2A, 2B or 2D, forming a fan beam which is electronically scanned in the plane of the array. In this arrangement, the receiver array 201b, e.g., FIG. 2A, 2B or 2D, is also a linear array mounted orthogonally to the transmitter array 201a. Data from the elements of this receiver array 201b may be processed with, for example, the Discrete Fourier Transform (DFT) to form a set of receiver fan beams. These are orthogonal to the scanning transmitter beam and intersect with it to form a set of scanning pencil beams. This is because the two way radar pattern is the product of the one way transmitter pattern and the one way receiver patterns.

In another arrangement, e.g., the configurations of FIGS. 2C and 2E which have transmitter and receiver elements arranged in parallel pairs forming a perimeter array (e.g., FIG. 2C) or displaced pairs (e.g., FIG. 2E), the two transmitter sub-arrays 201a, 201a' may form two fan beams with separate phase centers, the waveforms from the two transmitter fan beams is separately coded such that the two receiver sub-arrays 201b, 201b' can decode and apply phase correction for beam-forming. This is an adaption of a scanning fan beam technique but using MIMO techniques, and has the advantage of a smaller aperture for the same number of beams and the same beam-width.

Figure 4:
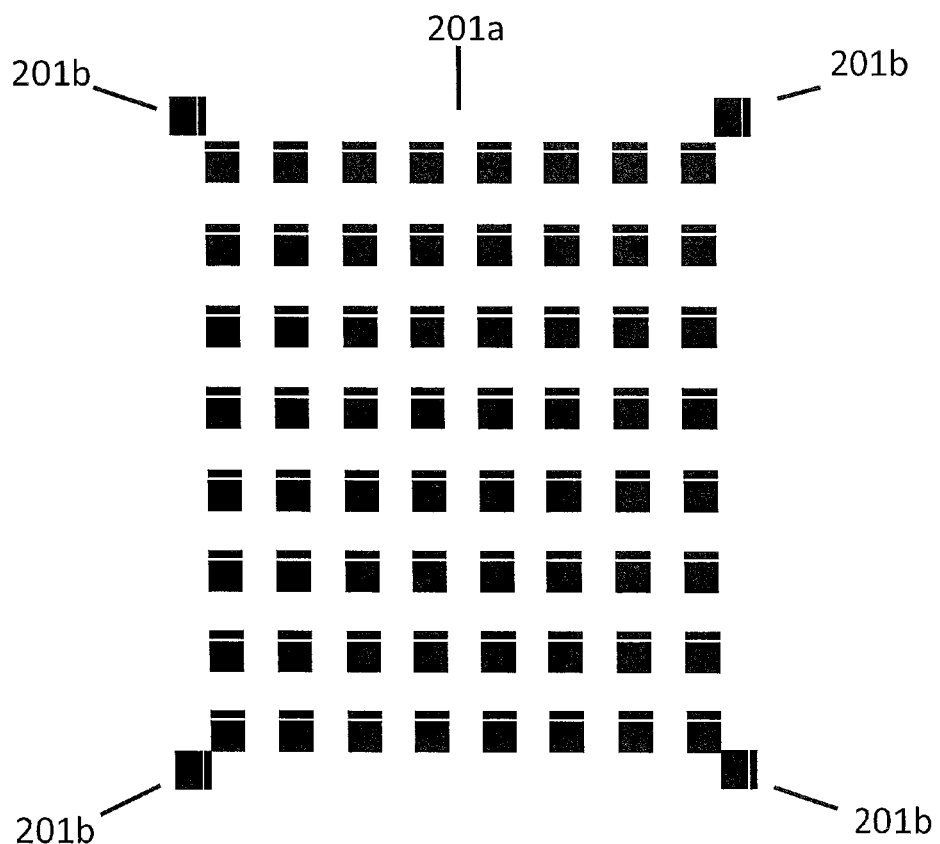
FIG. 4 is a schematic diagram of an alternative arrangement of the at least one transmitter array and at least one receiver array forming a compact two dimensional array, according to principles of the invention.

In another form, as shown in FIG. 4, the transmitter array 201a may comprise four transmitters located at the corners of a compact two dimensional array of, for example, 32 receiver elements. The four transmitters each illuminates the whole scene of interest, with their well separate phase centers forming directional patterns which, when combined with the patterns of the receiver array in the processor, will form four times the number of beams, each half the width the receiver beam. These two-way radar beams can be formed in parallel by the processor using a two dimensional Fast Fourier Transform. Hence the range profiles from the whole scene can be collected from the returns from just four transmissions. The four transmitter waveforms can be in time sequence, in which case this is a form of MIMO radar with Time Division Multiplexing, alternatively the four transmissions can be orthogonal code sequences, giving a form of MIMO with for instance PCM or OFDM coding. In yet another form, four simultaneous in-phase transmissions will first illuminate the scene to form a fine grain interference pattern. This sharpens the resolving power of receiver beams phased to be coincident with the grating lobes of the transmitter interference pattern. Second, third and fourth transmissions then illuminate the scene, with pairs in opposite phase, to scan the grating lobes in four increments over the scene. For each transmission the receiver beams are formed to be on the peaks of the grating lobes. In this way the 32 range profiles from the sequence of four transmissions can be interleaved to give 128 higher resolution range profiles, and the first return in each located to form a 32 by 32 sample of the terrain profile.

To maintain a robust terrain profile, in the presence of the slow fades typically encountered by radar altimeters in hovering vehicles, a signal detector with a short sampling widow may be utilized. The signal detector measures the range to the nearest point in each beam with leading edge trackers which search out from zero range to detect the first return. The first return in each beam is then tracked with a suitable early-late gate or similar. If the signal fades the tracker stays locked for a short interval and if the signal has not returned in this interval the tracker repeatedly searches out from zero again until it can lock onto the return signal.

The resultant ground profile may be displayed to the pilot for assessment as a contour plot or as a mesh plot. This would allow the pilot to independently judge which regions within a surveyed area may be suitable landing sites. The altimeter may employ an algorithm to automatically determine the suitability of a surveyed area for landing. The algorithm may incorporate such considerations as whether there is adequate rotor/wing clearance, whether the ground slope is sufficiently parallel to the landing gear and determining the height at which any obstacles on the landing zone project above the landing surface, in order to decide which regions within a surveyed area are suitable for landing. Areas identified as suitable and unsuitable could then be displayed to the pilot via display unit to further assist the pilot in the selection of a landing zone. An audible warning may also be provided if the ground in view has a profile falling outside the specification for a safe landing. If a vertical reference is available the display could be referenced to this, otherwise the terrain display would be referenced to the pitch and roll of the vehicle. In this case the image of the ground profile would tilt according to the vehicle's angle with respect to the ground.

It should be noted that not only are the transmitted signals required to be readily separable to produce a useful image of the ground profile, they also need to have a sufficient bandwidth for a range resolution suited to the required height measuring accuracy. Typically a radar altimeter with a leading edge tracker can deliver the required accuracy (+/−2 ft) with a 20 ns pulse, but waveforms which can be time-compressed to that length (pulse compression) are also suitable.

The above discussion focuses on the use of the MIMO technique to produce a multi-beam radar altimeter capable of producing a highly accurate ground profile image. As mentioned above, one of the other major problems effecting landing and takeoff operations of vertical takeoff vehicles is that of brownout. Most radar altimeters can function under such conditions and their performance is not degraded due to the interference caused by the dust particles, etc. The selection of the type of transmission signal plays a significant role in overcoming such performance issues. Radar transmissions in the millimeter wavelength of the spectrum are capable of readily penetrating through dust, smoke or other such particulate clouds. Thus, by applying to each of the transmitter elements of the array, a short pulse of wavelength in the order of a few millimeters (e.g., 16.3 GHz or 35 GHz), the altimeter can readily image the terrain beneath the vehicle during a brownout, or similar events.

The MIMO technique described above for the formation of multiple beams typically requires the transmission of long orthogonal transmitter code sequences from each transmitter element and the need for the ground returns to stay coherent during the sequence may limit the use of radar at speeds above a few knots. Furthermore, the MIMO technique may require heavy signal processing burden with consequential high power consumption and a limited update rate. An alternative technique to the MIMO technique may use similar antenna structures as was used for the MIMO radar but with differing transmitter waveforms and signal processing. This technique takes advantage of the fact that:

- Receiver arrays can form multiple beams at once by, for instance, applying the Discrete Fourier Transform to the data stream from the receiver elements. This enables very efficient beam-forming.
- The two-way radar directional patterns are formed as the product of the receiver directional patterns and the transmitter directional pattern
- Transmitter directional pattern can be scanned over the scene of interest from pulse to pulse, illuminating a wide footprint on the ground with each pulse, whilst the receiver arrays form multiple beams within the transmitter footprint.
- The wide transmitter footprint allows the entire area of interest to be covered with a few scans of the transmitter.
- Hence a suitable combination of transmitter and receiver two way patterns can scan a set of fine beam width directional patterns over the scene with a few transmissions.
- Typically the transmitter and receiver arrays will form fan beams orthogonal to each other where the intersection of transmitter and receiver fans form pencil beam.

In a simple first example to illustrate this technique, a linear transmitter array may be mounted orthogonal to a linear receiver array configured such as shown in FIG. 2A. A suitably timed sequence of wide band ranging signals is applied to the elements of the transmitter array 201a with phase shifts such as to form fan beam directional patterns stepped in sequence over the area of interest. The timing of the transmissions must be long enough to allow all the reflections from the region of interest to die away before the transmission is repeated. The phase shifts must form a linear phase slope across the aperture for any one ranging signal (typically a pulse). A sequence of different phase slopes then scans a fan beam across the scene.

The signals reflected from the scene are collected by the elements of the receiver array 201b and processed typically with a Discrete Fourier Transform (DFT). This synthesizes a set of receiver fan beam directional patterns aligned orthogonally to the transmitter fan beams. The intersection of the transmitter fan beam with the set of receiver fan beams forms a set of pencil beams. These are stepped over the scene as the transmitter fan beam is so stepped. The data streams received by these pencil beams are then processed to measure the time delay to the first return received in each pencil beam and this time delay is converted to a distance measure. The distance measured by each beam then defines a profile describing the topography seen by the radar in the beam angular coordinates. This ground profile may be displayed in suitable coordinates, and may be processed to determine if and where the topography is unsuitable for landing, showing such regions on the display.

This simple first example is based on a known scanning scheme, but has been adapted for a landing aid by measuring the ground topography, displaying an image of the topography, and giving a warning of unsafe conditions, which has not been previously provided.

In a second example, a new type of scanning technique is used. This offers an advantage over the first simple example, requiring an aperture which is half the size for a given performance (number of beams and beam-width) and with the same number of antenna elements. In this second example, two linear and parallel transmitter sub-arrays and two linear and parallel receiver sub-arrays are formed around the perimeter of a square such as shown in FIG. 2C. The two fan beams formed by the two transmitter sub-arrays (e.g., sub-arrays 201a, 201a') are stepped over the area of interest in synchronism, with the signals from the two sides transmitted simultaneously in the same phase and then in anti-phase at each pointing angle of the fan beams. The interference pattern so produced from the widely spaced transmitter arrays illuminates the ground with a row of narrow pencil beams within the fan beam footprint. These pencil beams will be spaced by twice their beam-width; hence the space between each beam needs to be filled. So, when the phase between the two fan beams is reversed the two fan beams will illuminate the ground again with a row of narrow pencil beams but interlaced between the co-phase pencil beams. In this way the area of interest is fully illuminated with rows of pencil beams in sequence as the fan beams are stepped over the area of interest.

At the receivers (e.g., receiver sub-arrays 201b, 201b') two sets of data may be received at each of the transmitter pointing angles: the set from the co-phase illumination, and the set from the anti-phase illumination. These are processed by first applying a DFT to the sum of these sets and then applying a DFT to the difference of these. This again forms two interlaced interference patterns, but orthogonal to the transmitter orthogonal patterns. A pencil beam as formed by the intersection of a transmitter and receiver fan beam now forms four pencil beams, doubling the resolving power in each dimension.

In order to achieve the maximum gain in each of these four beams the transmitter fan beam should be incremented in half beam-width steps across the scene and the receiver DFT should be interpolated to double the number of samples.

In one variation, the two transmitter sub arrays can be fired in sequence rather than simultaneously. The two interference patterns can then be formed in the receiver signal processing to complete the transmitter beam synthesis. This is a form of MIMO radar with simple time-division-multiplexing (TDM) providing orthogonal coding for the two transmitter sub-arrays only. However, with this variation, only half of the transmitters are used for any one burst, so halving the total energy available to illuminate the scene. In another variation, both transmitter arrays fire simultaneous to provide the full available energy. For this the two transmitter sub arrays each transmit a code sequence forming an orthogonal pair, using for instance phase code modulated or orthogonal frequency code (PCM or OFDM). The signal stream from the receiver array elements are then de-coded into the two channels representing the reflections from the scene as illuminated by the two transmitter fan beams with their displaced phase centers. The sum and differences output from these two fan-beams are then processed as with the TDM approach.

In yet another embodiment, the transmitter and receiver arrays can be in a square or rectangular format, for instance the arrangement in FIG. 4, where a square array of receiver elements (201a) feeds a two dimensional Fast Fourier Transform (2D-DFT). This simultaneously synthesizes a set of receiver beams covering the scene from just one transmission. When the scene is illuminated with simultaneous waveforms from the four transmitter elements a two-dimensional interference pattern is formed illuminating the scene with an array of dark and light footprints. These bright footprints are narrower than the receiver beam footprints and the combined transmitter and receiver pattern spans a finer resolution area of the scene than the receiver beam alone. With appropriate element geometry the nulls in the receiver pattern will coincide with the remaining peaks of the transmitter interference pattern. The gaps in the transmitter interference pattern are filled stepping the transmitter interference across the scene with suitable phase shifts applied to the transmitter elements. For each of these transmissions the 2D FFT outputs are interleaved to form the higher resolution image.

The overall requirement for this and other variations is that:
the spatial convolution of the transmitter positions and the receiver positions forms a synthesized co-array of the form required to synthesize the desired directional patterns;
and the receiver array simultaneously forms multiple receiver beams intersecting the scene illuminated by a single transmitter beam; and
the transmitter beams complete the cover using MIMO or sequential scanning.

This combination offers faster sector cover than is possible with a single scanning beam or with the fully coded MIMO approach requiring long code sequences.

It is to be understood that the above examples have been provided only by way of exemplification of this invention, and that further modifications and improvements thereto, as would be apparent to persons skilled in the relevant art, are deemed to fall within the broad scope and ambit of the present invention described herein.

I claim:

1. A radar ranging system for imaging the topography of an area of interest, said system comprising:
at least one linear array of transmitter elements that transmit transmitter beams comprising a sequence of ranging signals phased to form a beam pattern covering part of the area of interest, the sequence phased to scan the beam pattern over an entire area of interest;
at least one linear array of receiver elements arranged orthogonally to the transmitter linear arrays wherein each receiver element receives a time sequence of the ranging signals reflected from variations on the ground as illuminated by the sequence of the ranging signals, the receiver elements each producing a receiver signal; and
at least one processor adapted to process each receiver signal, wherein the at least one processor forms a multiplicity of receiver beams complementary to the transmitter beams such that the combination of the transmitter beams and the receiver beams form pencil beams which cover the entire area of interest in time sequence, wherein the at least one processor measures a time delay of a first reflection received in each of the formed pencil beams and converts the time delay into a range measure at each beam angle to form a topographic profile of the area of interest in range and beam angle coordinates.

2. The radar ranging system of claim 1, wherein the at least one processor is configured to process the topographic profile to display an image of the terrain topography in the area of interest.

3. The radar ranging system of claim 1, wherein the at least one processor is configured to process the topographic profile in the area of interest to determine if the area of interest is safe for landing an aircraft.

4. The radar ranging system of claim 3, wherein the at least one processor is configured to provide a warning signal if a hazard is present and configured to show one of: a hazard and a safe area on a display.

5. The radar ranging system of claim 1, wherein the at least one processor is configured to output a display of the topographic profile as one of: a color display, a contour display, or mesh plot display.

6. The radar ranging system of claim 5 where the display is referenced to a vertical coordinate system.

7. The radar ranging system of claim 5 where the display is referenced to a coordinate system of a platform employing the imaging system.

8. The radar ranging system of claim 5, wherein the display is presented as an artificial perspective of the ground as viewed from an aircraft platform.

9. The radar ranging system of claim 1, wherein the topographic profile is further processed to determine a substantially level area within the area of interest.

10. The radar ranging system of claim 9, wherein the substantially level area is identified on a display of the image of the terrain topography.

11. The radar ranging system of claim 9, wherein the at least one processor is configured to provide a warning if no substantially level area can be identified.

12. The radar ranging system of claim 11, wherein the warning comprises an audible warning.

13. The radar ranging system of claim 1, wherein the transmitter elements and receiver elements comprise transmitter and receiver sub-arrays, respectively.

14. The radar ranging system of claim 1, wherein a time delay on a first return in each beam is captured and scaled to a range measurement.

15. The radar ranging system of claim 14, wherein the shortest range measured by all the beams is displayed numerically as radar altitude.

16. The radar ranging system of claim 1, wherein the at least one processor is further adapted to compare the topographic profile with a threshold value denoting the slope, a level clearance, and a flatness according to pre-specified data to safely land an airborne vehicle within the area of interest and display suitable and unsuitable areas to an operator of the airborne vehicle.

17. The radar ranging system of claim 1, wherein the at least one processor is adapted to compare the topographic profile with pre-specified profiles needed for safe rotor and tail rotor clearance on approach to the area of interest and display suitable and unsuitable areas for landing.

18. The radar ranging system of claim 1, wherein the at least one linear array of transmitter arrays comprises two transmitter arrays of 16 elements each operating at about 35 GHz and the at least one linear array of receiver elements comprises two receiver arrays of 16 elements each forming 1024 pencil beams.

19. The radar ranging system of claim 1, wherein the at least one processor forms a guard channel to mitigate the effect of sidelobe leakage.

20. The radar ranging system of claim 1, wherein the at least one processor performs a Clean Algorithm on the data streams from all the beams to mitigate any effects caused by sidelobe leakage.

21. The radar ranging system of claim 1, wherein the radar ranging system is mounted to look down, to assist operators make a vertical landing.

22. The radar ranging system of claim 1, wherein the radar ranging system is mounted to include a suitable forward look in the area of interest, to assist operators making a forward approach to the landing zone.

* * * * *